United States Patent
Stewart et al.

(10) Patent No.: US 11,409,876 B2
(45) Date of Patent: Aug. 9, 2022

(54) DISPLAYING A BIOS UPDATE PROGRESS

(71) Applicant: Hewlett-Packard Development Company, L.P., Spring, TX (US)

(72) Inventors: Christopher H Stewart, Houston, TX (US); Baraneedharan Anbazhagan, Houston, TX (US); Lan Wang, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 477 days.

(21) Appl. No.: 16/603,283

(22) PCT Filed: Apr. 24, 2017

(86) PCT No.: PCT/US2017/029129
§ 371 (c)(1),
(2) Date: Oct. 7, 2019

(87) PCT Pub. No.: WO2018/199893
PCT Pub. Date: Nov. 1, 2018

(65) Prior Publication Data
US 2021/0110041 A1      Apr. 15, 2021

(51) Int. Cl.
*G06F 21/57*      (2013.01)
*G06F 8/654*      (2018.01)

(52) U.S. Cl.
CPC .......... *G06F 21/572* (2013.01); *G06F 8/654* (2018.02); *G06F 2221/033* (2013.01)

(58) Field of Classification Search
None
See application file for complete search history.

(56) References Cited

U.S. PATENT DOCUMENTS

| 6,308,265 B1 | 10/2001 | Miller |
| 7,213,152 B1 | 5/2007 | Gafken et al. |

(Continued)

FOREIGN PATENT DOCUMENTS

WO      WO-16003455      1/2016

OTHER PUBLICATIONS

Regenscheid, Andrew, "BIOS Protection Guidelines for Servers (Draft)", NIST Special Publication 800-147B, Jul. 2012, 31 pages. (Year: 2012).*

(Continued)

*Primary Examiner* — Michael Pyzocha
(74) *Attorney, Agent, or Firm* — Rahman LLC

(57) ABSTRACT

The update progress of a basic input/output system (BIOS) is displayed on a display screen. A first chipset lock is applied to a first region of a shared serial peripheral interface (SPI) chip of the BIOS of a computer system containing a first program of instructions. A system management memory mode lock is applied to a second and a third region of the shared SPI chip containing a second and third programs of instructions respectively. The second program of instructions is updated, and control of the BIOS is transferred to the updated second program of instructions. The updated second program of instructions updates the first program of instructions. The BIOS update progress visual is displayed on the display screen of the computer system while updating the first program of instructions.

20 Claims, 5 Drawing Sheets

(56) References Cited

U.S. PATENT DOCUMENTS

| | | | |
|---|---|---|---|
| 7,962,736 B1 * | 6/2011 | Polyudov | G06F 8/65 710/48 |
| 8,495,354 B2 | 7/2013 | Hobson et al. | |
| 8,589,302 B2 | 11/2013 | Prakash et al. | |
| 8,898,797 B2 | 11/2014 | Konetski et al. | |
| 2010/0030991 A1 | 2/2010 | Liu et al. | |
| 2011/0119474 A1 * | 5/2011 | Singh | G06F 8/65 713/2 |
| 2012/0036308 A1 * | 2/2012 | Swanson | G06F 12/1433 711/170 |
| 2014/0040605 A1 * | 2/2014 | Futral | G06F 21/572 713/2 |
| 2014/0237262 A1 | 8/2014 | Jaber et al. | |
| 2015/0235029 A1 * | 8/2015 | Morishige | G06F 21/572 713/1 |
| 2016/0085558 A1 * | 3/2016 | Anbazhagan | G06F 8/654 713/2 |
| 2016/0147996 A1 * | 5/2016 | Martinez | H04L 9/0877 713/171 |
| 2016/0328300 A1 * | 11/2016 | Rahardjo | G06F 11/1417 |
| 2017/0010875 A1 * | 1/2017 | Martinez | G06F 21/60 |
| 2017/0085383 A1 * | 3/2017 | Rao | G06F 21/575 |
| 2018/0088962 A1 * | 3/2018 | Balakrishnan | G06F 11/0757 |

OTHER PUBLICATIONS

Update Ami Bios (woodpecker, Robin), Dec. 6, 2010,< http://developer.toradex.com/knowledge-base/update-ami-bios-(woodpecker-robin) >.

* cited by examiner

DISPLAYING A BIOS UPDATE PROGRESS

BACKGROUND

The Basic Input/Output System (BIOS) may include computer program instructions that initialize the input and output operations of the computer system. The BIOS may take control of the computer system at the beginning stages of the computer system startup. The computer program instructions in the BIOS may need to be updated to the latest release by the computer system vendor. While performing such updates, the BIOS program instructions should be protected from an untrusted source.

DETAILED DESCRIPTION

The examples herein provide a secure BIOS update, while displaying an update progress video on a screen for a user of the computer system. This provides a user-friendly solution and also provides the required security during the BIOS update process. The examples herein overcome the issue of a lack of sufficient updates regarding the progress of the BIOS update and thereby reduce the possibility that a user may reboot the computer system while the update is taking place, which overcomes potential failures of the BIOS update process.

Figure 1:
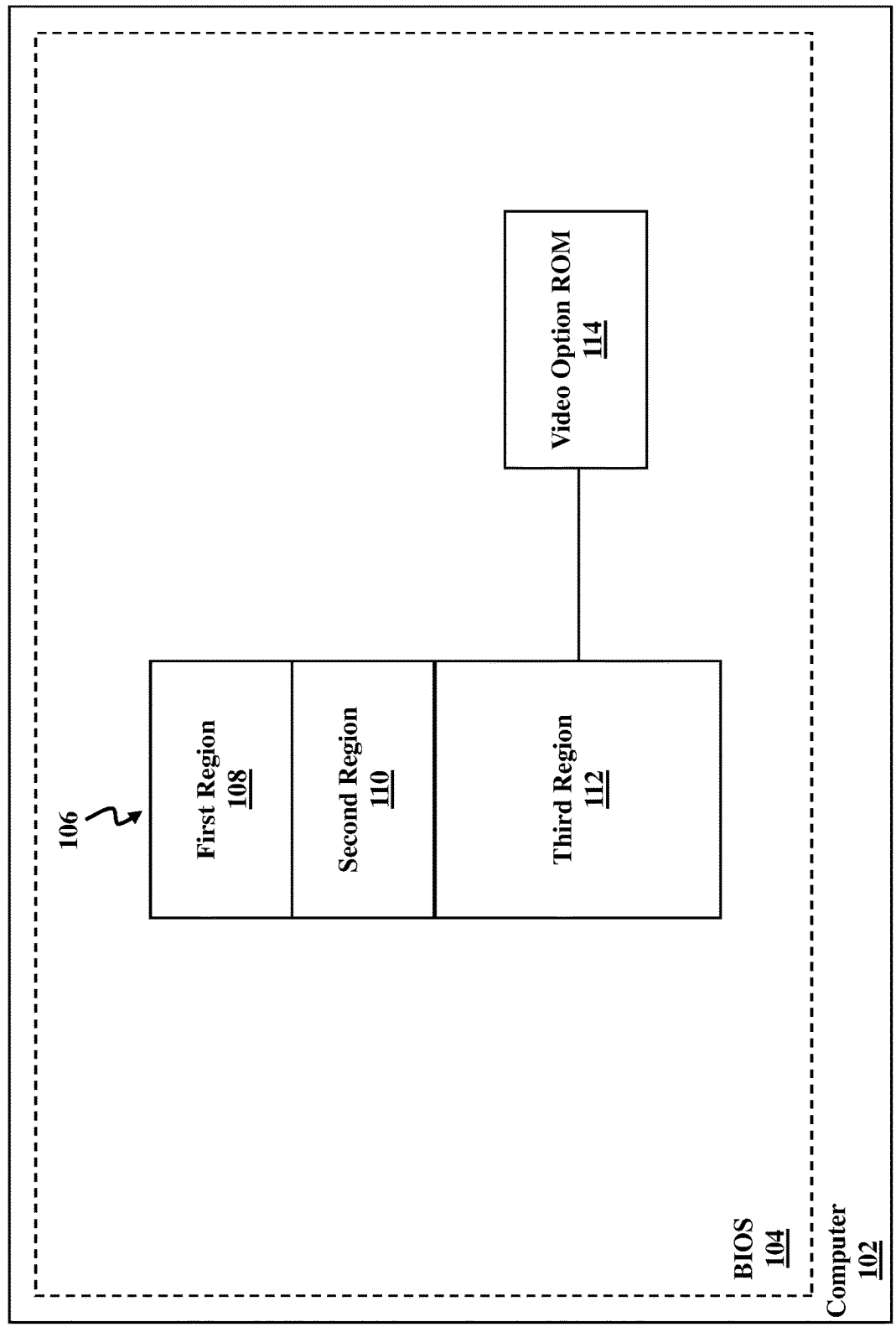
FIG. 1 is a schematic diagram illustrating a BIOS system, according to an example herein.

FIG. 1 is a schematic diagram illustrating a system 100, according to an example herein. The system 100 may include a shared serial peripheral interface (SPI) chip 106 of a BIOS 104 of a computer 102. The BIOS 104 includes a first region 108 configured to store a first copy of a pre-extensible firmware interface (PEI) program of instructions. A second region 110 of the BIOS 104 may be configured to store a second copy of the PEI program of instructions. A third region 112 may be configured to store a driver execution environment (DXE) program of instructions.

The DXE program of instructions may include more features compared to the PEI program of instructions. For example, the DXE program can have access to the drivers of other components of the computer 102, such as a graphical card. In an example herein, the DXE program of instructions may display a progress of an update of the first PEI program of instructions, using a video option read-only memory (ROM) 114 and the DXE program of instructions. The PEI program of instructions may not have the capability of using the video option ROM 114, or the PEI program of instructions may have the capability of using a video option ROM that lacks the richness of display features available to the DXE program of instructions.

The shared SPI chip 106 may be configured to apply a first chipset lock to the first region 108, and apply a system management memory mode (SMM) lock to the second and third regions 110 and 112. In an example herein, when the chipset lock is applied to a region of a chip 106, it will prevent any write to that region of the chip 106 until the chip 106 is reset. Therefore, in an example herein, when the first chipset lock is applied to the first region 108 of the shared SPI chip 106, nothing can be written to the first region 108 until the shared SPI chip 106 is reset. In an example, resetting the SPI chip 106 includes electronically disconnecting the chip 106 from a power source, and then reconnecting the chip 106 to the power source.

In an example herein, when the SMM lock is applied to a region of a chip 106, only a special software of the operating system of the computer system 102 may write data to that region of the chip 106. In an example herein, this special software is isolated from the rest of the operating system of the computer system 102.

Figure 2:
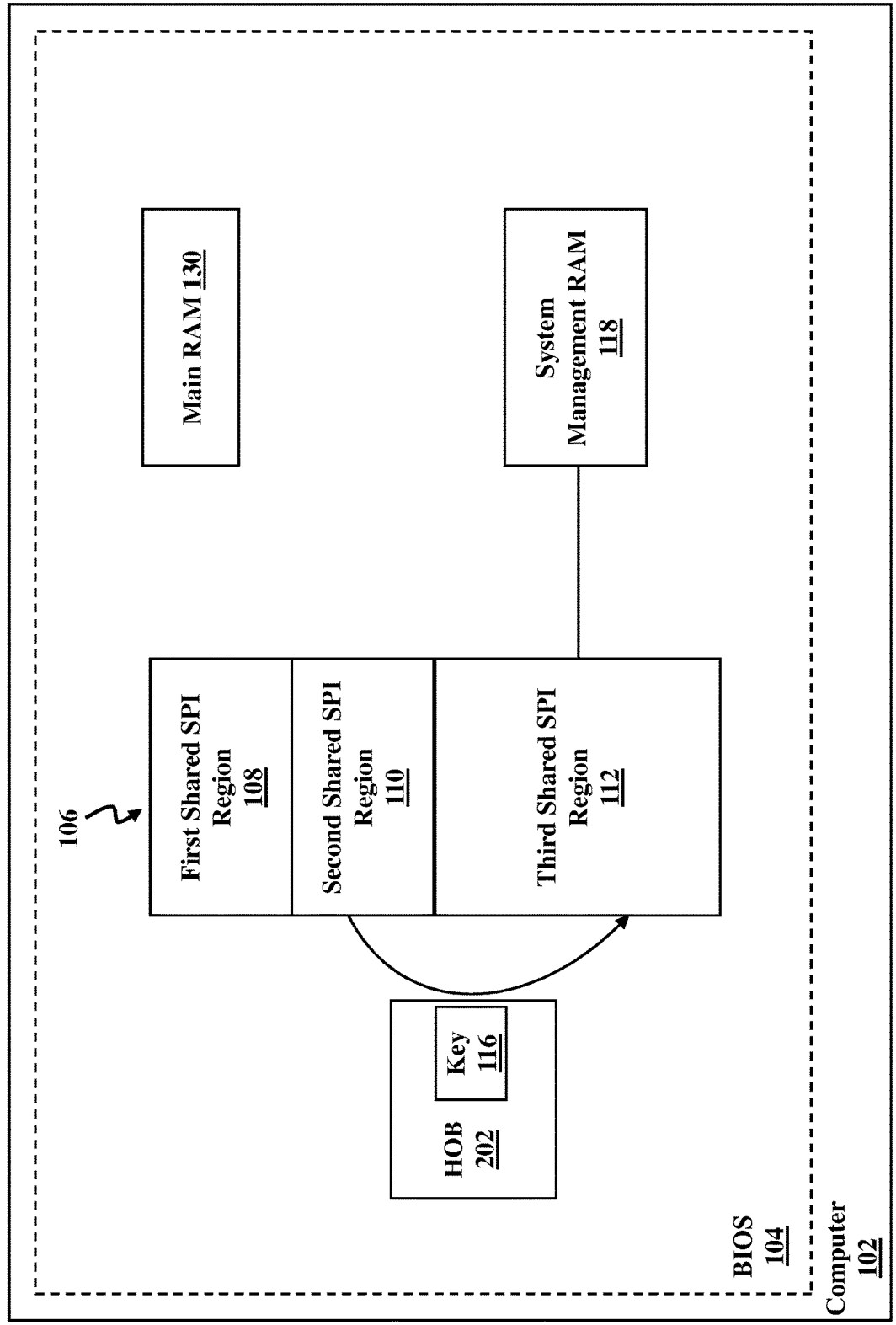
FIG. 2 is a schematic diagram illustrating an update process of a BIOS system, according to an example herein.

FIG. 2, with reference to FIG. 1, is a schematic diagram illustrating a system 200, according to an example herein. The BIOS 104 may be configured to update the second copy of the PEI program of instructions and execute the updated second copy of the PEI program of instructions. In an example herein, the BIOS 104 may be configured to apply a second chipset lock to the second region 110 of the shared SPI chip 106. The BIOS 104 may apply the second chipset lock after executing the updated second copy of the PEI program of instructions.

In an example herein, the BIOS 104 may be configured to generate a random number shared secret key 116, and transmit the random number shared secret key 116 to the third region 112 of the shared SPI chip 106. In an example herein, the random number shared secret key 116 is a set of digital values. The BIOS 104 may store the random number shared secret key 116 in a system management random access memory (SMRAM) 118. In an example herein, the SMRAM 118 is isolated from a main random access memory (RAM) 130 of the computer system 102. The SMRAM 102 may also store the special software of the operating system of the computer system 102 that is configured to write data to the SMM locked regions of the shared SPI chip 106.

In an example herein, after storing the random number shared secret key 116 in the SMRAM 118, the BIOS 104 may securely delete a received copy of the random shared secret key 116 by the third region 112 of the shared SPI chip 106. Securely deleting the received copy of the shared secret key 116 by the third region 112 of the shared SPI chip 106 may include digitally shredding the received copy of the shared secret key 116 by zeroing out the received copy of the shared secret key 116 using a secure zero memory operation. In an example herein, the zero memory operation is considered secure if it meets two requirements as set forth by the United States National Institute of Standards and Technology (NIST). First, the memory location that is being securely zeroed out is to be assigned several different values in succession, and then is assigned the value of "zero." Second, the secure zero memory operation is to be written in a language-specific manner such that a compiler does not need to further optimize the secure zero memory operation.

In an example herein, the random number shared secret key 116 may be sent from the second region 110 to the third region 112 via a hand-off block (HOB) 202. The HOB 202 is a data structure used for transmitting data between the PEI and DXE program of instructions.

Figure 3:
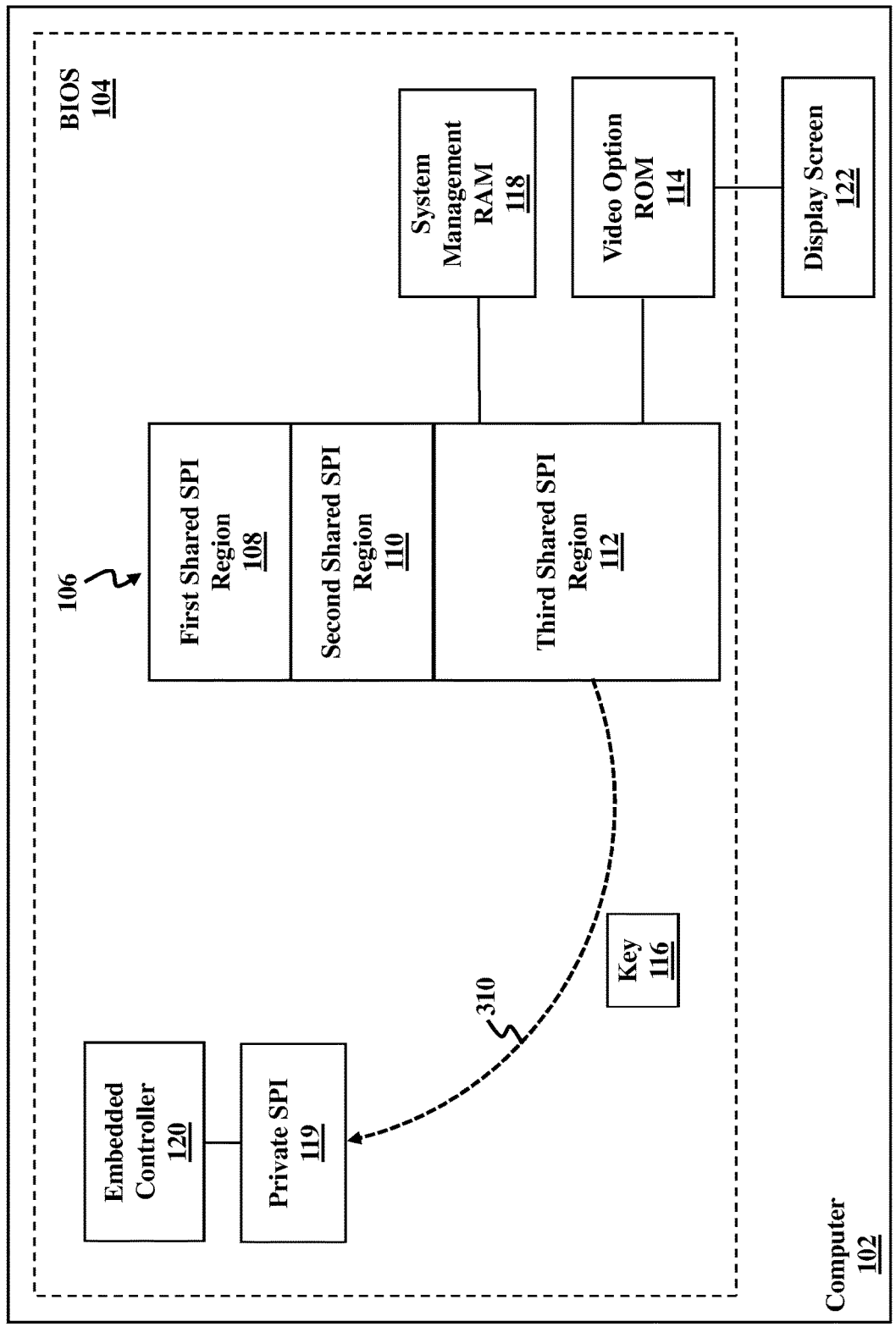
FIG. 3 is a schematic diagram illustrating an update process of a BIOS system, according to an example herein.

FIG. 3, with reference to FIGS. 1 and 2, is a schematic diagram illustrating a system 300, according to an example herein. The BIOS 104 may further include an embedded controller (EC) 120 and a private SPI chip 119 electronically coupled to the embedded controller 120. In an example herein, the private SPI chip 119 may be electronically isolated from any other component of the BIOS 104, except the embedded controller 120.

In an example herein, the BIOS 104 may be set to transmit the random number shared secret key 116 to the private SPI chip 119. The BIOS 104 may transmit the random number shared secret key 116 to the private SPI chip 119 using the embedded controller 120. After transmitting the random number shared secret key 116 to the private SPI chip 119, the BIOS 104 may seal a trusted application program interface (API) on the embedded controller 120 to secure the random number shared secret key 116. In an example herein, the BIOS 104 may seal the API on the embedded controller using SMM lock. In an example, any other mechanism may be used for sealing the API, provided the mechanism renders the specific location of the private SPI chip 119 which is controlled by the embedded controller 120, immutable until the BIOS power is reset or a demonstrated trusted caller requests that the seal be removed for a temporary duration. In an example, the demonstrated trusted caller is a caller with knowledge of the shared secret key 116.

In an example herein, the BIOS 104 may be set to securely transfer the updated second copy of the PEI program of instructions from the second region 110 to the private SPI chip 119. The BIOS 104 may hash the updated second copy of the PEI program of instructions using the random number shared secret key 116 before transferring to the private SPI 119. In an example herein, to establish trust with the embedded controller 120, the BIOS 104 may use a keyed-hash message authentication code (HMAC) process, such as Secure Hash Algorithm 2 (SHA-2) for securely transferring the updated second copy of the PEI program of instructions from the second region 110 to the private SPI chip 119, using the random number shared secret key 116. In an example herein, the BIOS 104 may securely transfer the updated second copy of the PEI program of instructions from the second region 110 to the private SPI chip 119, one block at a time, using HMAC on each block.

In an example herein, the BIOS 104 may display the update progress of copying the PEI program of instructions from the second region 110 to the private SPI chip 119, using the video option ROM 114, while securely transferring the updated second copy of the PEI program of instructions. In an example herein, the video option ROM 114 may be communicatively coupled to a display screen 122 of the computer 102. The update progress may be displayed on the display screen 122 using, for example, any of a progress bar, textual update, or a simulated image or video sequence of the BIOS updating process.

In an example herein, the embedded controller 120 may be configured to verify the authentication of the hashed updated second copy of the PEI program of instructions using the random number shared secret key 116 that is securely stored in the private SPI chip 119. In an example, the hashed version of the second copy of the PEI program of instructions is divided into multiple blocks of data and is sent to the private SPI chip 119 of the embedded controller 120 one block at a time. A block of data may be of any size supported by a communication mechanism 310 between the shared SPI chip 106 and the private SPI chip 119 of the embedded controller 120. In an example, the authentication of each individual block is verified by the embedded controller 120. In another example, the individual blocks are rearranged in succession to reconstruct the transmitted hashed version of the second copy of the PEI program of instructions, and the authentication of the received data is also verified after it is reconstructed. The verifications by the embedded controller 120 may be performed using the HMAC process, as described above. If the embedded controller 120 verifies the authentication, the embedded controller 120 may extract the updated second copy of the PEI program of instructions using the random number shared secret key 116.

After the embedded controller 120 verifies the authentication of the hashed updated second copy of the PEI program of instructions, the BIOS 104 may reset the shared SPI chip 106. Resetting the shared SPI chip 106 removes the first chipset lock on the first region 108 of the shared SPI chip 106.

In an example herein, after removing the first chipset lock from the first region 108 of the shared SPI chip 106, the embedded controller 120 transfers the updated second copy of the PEI program of instructions to the first region 108 of the shared SPI chip 106. After transferring the updated second copy of the PEI program of instructions to the first region 108 of the shared SPI chip 106, the updated program of instructions in the first region 108 is executed.

Figure 4:
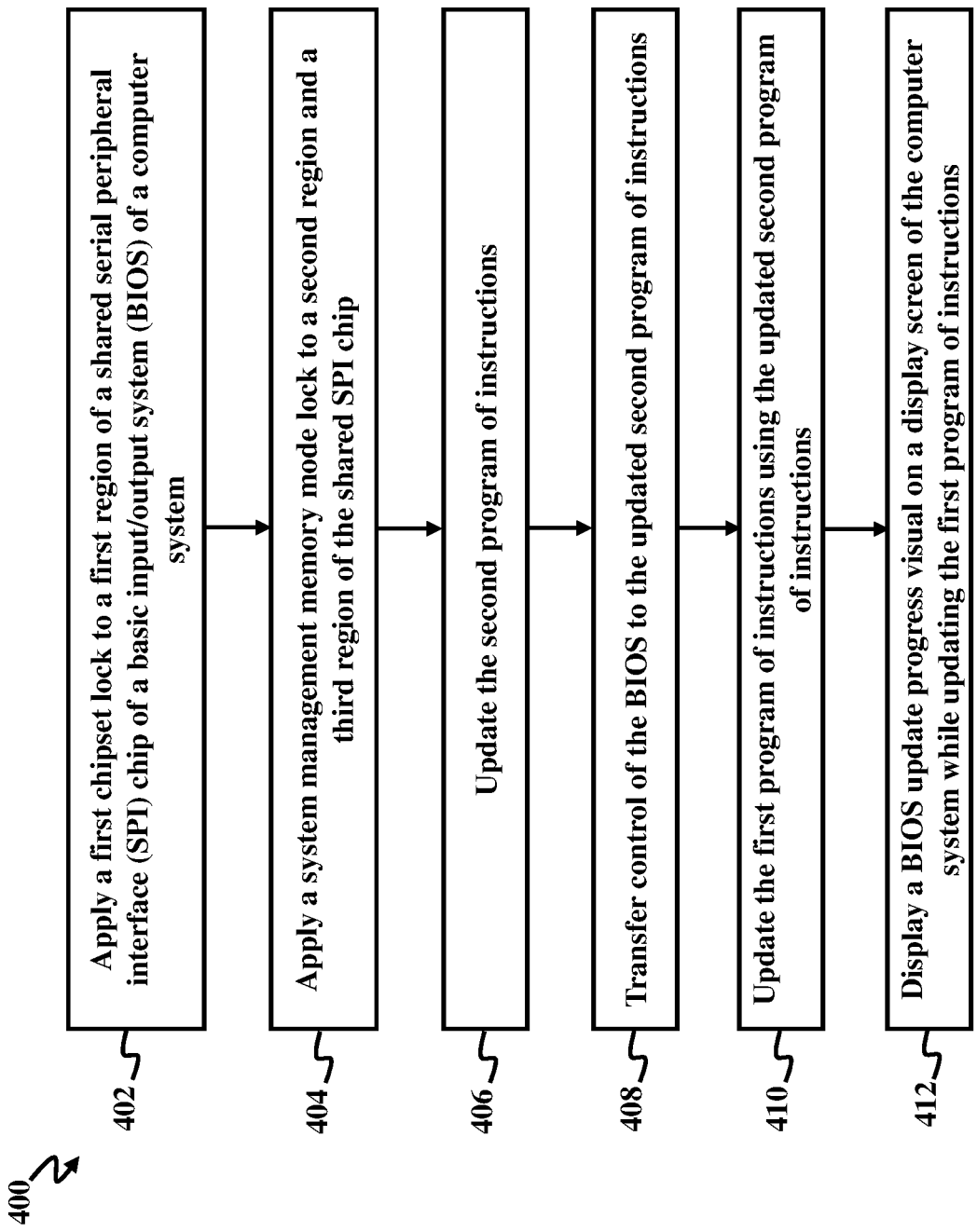
FIG. 4 is a flow diagram illustrating a method for updating a BIOS system, according to an example herein.

FIG. 4, with reference to FIGS. 1 through 3, is a flowchart illustrating a method 400 according to an embodiment herein. At block 404, the method 400 may apply a first chipset lock to a first region 108 of a shared SPI chip 106 of a BIOS 104 of a computer system 102. The first region 108 may contain a first program of instructions.

At block 404, the method 400 may apply a system management memory mode lock to a second region 110 and a third region 112 of the shared SPI chip 106, wherein the second region 110 contains a second program of instructions, and the third region 112 contains a third program of instructions. At block 406, the method 400 may update the second program of instructions.

At block 408, the method 400 may transfer control of the BIOS 104 to the updated second program of instructions. At block 410, the method 400 may update the first program of instructions using the updated second program of instructions. At block 412, the method 400 may display a BIOS update progress visual on a display screen 122 of the computer system 102 while updating the first program of instructions.

In an example herein, the method 400 may further include executing the updated second program of instructions, and applying a second chipset lock to the second region 110 of the shared SPI chip 106. In another example herein, the method 400 may further include generating a random number shared secret key 116, transmitting the random number shared secret key 116 to the third region 112 of the shared SPI chip 106, storing the random number shared secret key 116 in a system management random access memory (SM-RAM) 118 of the computer system 102, and securely deleting a received copy of the random shared secret key 116 by the third region 112 of the shared SPI chip 106.

In another example herein, the method 400 may further include transmitting the random number shared secret key 116 to an embedded controller 120 of the BIOS 104, and securing the random number shared secret key 116 by sealing a trusted application program interface on the embedded controller 120 to prevent the random number shared secret key 116 from being changed by another computer system.

In another example herein, the method 400 may further include hashing the updated second program of instructions using the random number shared secret key 116, securely transferring the updated second program of instructions from the second region 110 to a private SPI chip 119, wherein the private SPI chip 119 may be controlled by the embedded controller 120, and displaying the BIOS update progress visual on the display screen 122 while securely transferring the updated second program of instructions.

In another example herein, the method 400 may include verifying the authentication of the hashed updated second program of instructions using the random number shared secret key 116, and resetting the BIOS 104 when the authentication of the hashed updated second program of instructions is verified.

In another example herein, the method 400 may include removing the first chipset lock from the first region 108 of the shared SPI chip 106, and transferring the updated second program of instructions to the first region 108 of the shared SPI chip 106.

Various examples herein can include both hardware and software elements. The examples that are implemented in software include but are not limited to, firmware, resident software, microcode, etc. Other examples may include a computer program product configured to include a pre-configured set of instructions, which when performed, can result in actions as stated in conjunction with the methods described above. In an example, the pre-configured set of instructions can be stored on a tangible non-transitory computer readable medium or a program storage device containing software code.

Figure 5:
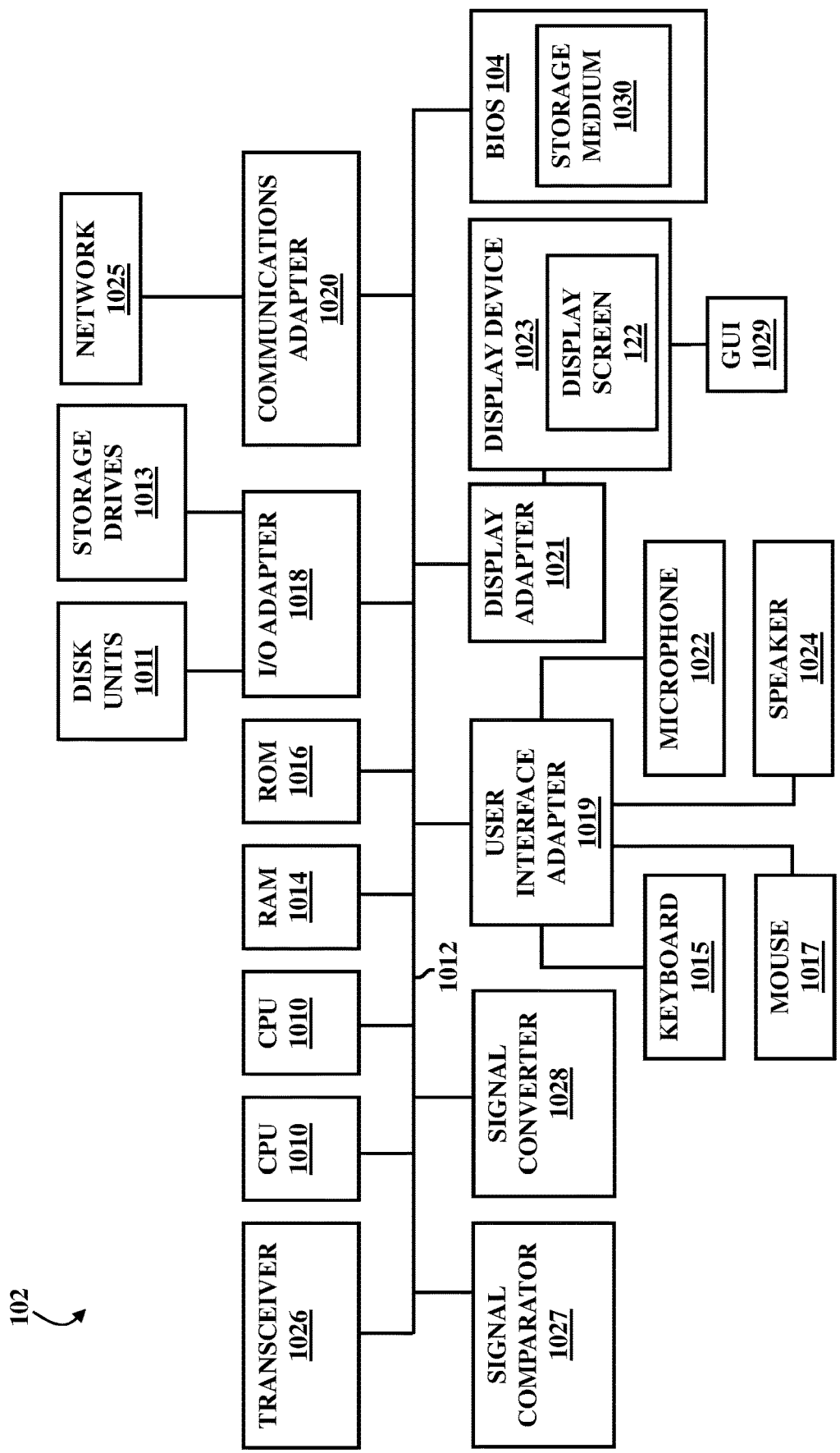
FIG. 5 illustrates a schematic diagram of a computer system used in accordance with the examples herein.

A representative hardware environment for practicing the examples herein is depicted in FIG. 5, with reference to FIGS. 1 through 4. This schematic drawing illustrates a hardware configuration of the information handling/computer system 102 according to an example. The computer system 102 may include at least one processor or central processing unit (CPU) 1010. The CPUs 1010 are interconnected via system bus 1012 to various memory devices 1014, 1016 such as a random access memory (RAM) 1014 and a read-only memory (ROM) 1016. The memory devices 1014, 1016 can include local memory employed during actual execution of the program code, bulk storage, and cache memories which provide temporary storage of at least some program code in order to reduce the number of times code must be retrieved from bulk storage during execution. An I/O adapter 1018 can connect to peripheral devices, such as disk units 1011 and storage drives 1013, or other program storage devices that are readable by the computer system 102. The computer system 102 may further include a user interface adapter 1019 that may connect to a keyboard 1015, mouse 1017, speaker 1024, microphone 1022, and/or other user interface devices such as a touch screen device (not shown) to the bus 1012 to gather user input. Additionally, a communication adapter 1020 connects the bus 1012 to a data processing network 1025, and a display adapter 1021 connects the bus 1012 to a display device 1023, which provides a graphical user interface (GUI) 1029 for a user to interact with. The display device 1023 may include the display screen 122. Further, a transceiver 1026, a signal comparator 1027, and a signal converter 1028 may be connected to the bus 1012 for processing, transmission, receipt, comparison, and conversion of electric or electronic signals, respectively.

The computer system 102 may further include the BIOS 104 including a storage medium 1030. In an example herein, the storage medium 1030 may be a non-transitory machine-readable storage medium storing instructions that upon execution cause the BIOS 104 to apply a first chipset lock to a first pre-extensible firmware interface initialization (PEI) region 108 of a shared serial peripheral interface (SPI) chip 106 of the basic input/output system (BIOS) 104 of the computer system 102.

The stored instructions, upon execution, may further cause the BIOS 104 to update a program of instructions stored in a second PEI region 110 of the shared SPI chip 106, execute the updated program of instructions from the second PEI region 110, and generate a random number shared secret key 116.

The stored instructions, upon execution, may further cause the BIOS 104 to apply a second chipset lock to the second PEI region 110, and transmit the updated program of instructions to a driver execution environment (DXE) region 112 of the shared SPI chip 106.

The stored instructions, upon execution, may further cause the BIOS 104 to apply a third chipset lock to the D×E region 112 of the shared SPI chip 106, and transfer the random number shared secret key 116 to the D×E region 112 via a HOB 202, which may include a format readable by the D×E region 112.

The stored instructions, upon execution, may further cause the BIOS 104 to store the random number shared secret key 116 in a SMRAM 118, and transmit the random number shared secret key 116 to an embedded controller 120 of the BIOS 104.

The stored instructions, upon execution, may further cause the BIOS 104 to hash the updated program of instructions using the random number shared secret key 116, and securely transfer the updated program of instructions from the D×E region 112 to a private SPI chip 119 wherein the private SPI chip 119 may be controlled by the embedded controller 120.

In an example, after the BIOS 104 stores the random number shared secret key 116 in the SMRAM 118, and securely transfers the updated program of instructions from the D×E region 112 to the private SPI chip 119, the BIOS 104 may remove the random number shared secret key 116 from the D×E region 112 by a secure zero memory operation. In an example, after the BIOS 104 securely transfers the updated program of instructions from the D×E region 112 to the private SPI chip 119, the shared SPI chip 106 is rebooted, and following the reboot the random number shared secret key 116 is securely removed from the D×E region 112. However, the BIOS 104 may retain the random number shared secret key 116 in the D×E region 112 while transmission of the updated program of instructions from the D×E region 112 to the private SPI chip 119 is in progress.

The stored instructions, upon execution, may further cause the BIOS 104 to present an update progress message to a display screen 122, using a video option read-only memory (ROM) 114, while securely transferring the updated program of instructions from the D×E region 112 of the shared SPI chip 106 to the private SPI chip 119, regardless whether the video option ROM 114 is trusted.

In an example herein, the non-transitory machine-readable storage medium 1030 may store instructions that upon execution cause the BIOS 104 to verify authentication of the hashed updated program of instructions at the private SPI chip 106 using the random number shared secret key 116, reset the shared SPI chip 106 when the authentication of the hashed updated program of instructions is verified, remove the first chipset lock from the first PEI region 108 of the shared SPI chip 106, and transfer the updated program of instructions to the first PEI region 108 of the shared SPI chip 106.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A method comprising:
applying a first chipset lock to a first region of a shared serial peripheral interface (SPI) chip of a basic input/output system (BIOS) of a computer system, wherein the first region contains a first program of instructions;
applying a system management memory mode lock to a second region and a third region of the shared SPI chip, wherein the second region contains a second program of instructions, and the third region contains a third program of instructions;
generating a random number shared secret key;
transmitting the random number shared secret key to the third region of the shared SPI chip;
storing the random number shared secret key in a system management random access memory (SMRAM) of the computer system;
securely deleting a received copy of the random shared secret key by the third region of the shared SPI chip;
updating the second program of instructions;
transferring control of the BIOS to the updated second program of instructions;
updating the first program of instructions using the updated second program of instructions; and
displaying a BIOS update progress visual on a display screen of the computer system while updating the first program of instructions.

2. The method of claim 1, comprising:
executing the updated second program of instructions; and
applying a second chipset lock to the second region of the shared SPI chip.

3. The method of claim 2, comprising:
removing the first chipset lock from the first region of the shared SPI chip; and
transferring the updated second program of instructions to the first region of the shared SPI chip.

4. The method of claim 1, comprising:
transmitting the random number shared secret key to an embedded controller of the BIOS; and
securing the random number shared secret key by sealing a trusted application program interface on the embedded controller to prevent the random number shared secret key from being changed by another computer system.

5. The method of claim 4, comprising:
hashing the updated second program of instructions using the random number shared secret key;
securely transferring the updated second program of instructions from the second region to a private SPI chip, wherein the private SPI chip is controlled by the embedded controller; and
displaying the BIOS update progress visual while securely transferring the updated second program of instructions.

6. The method of claim 5, comprising:
verifying authentication of the hashed updated second program of instructions using the random number shared secret key; and
resetting the BIOS when the authentication of the hashed updated second program of instructions is verified.

7. A non-transitory machine-readable storage medium storing instructions that upon execution cause an electronic device to:
apply a first chipset lock to a first pre-extensible firmware interface initialization (PEI) region of a shared serial peripheral interface (SPI) chip of a basic input/output system (BIOS) of a computer;
update a program of instructions stored in a second PEI region of the shared SPI chip;
execute the updated program of instructions from the second PEI region;
generate a random number shared secret key;
apply a second chipset lock to the second PEI region;
transmit the updated program of instructions to a driver execution environment (DXE) region of the shared SPI chip;
apply a third chipset lock to the DxE region of the shared SPI chip;
transfer the random number shared secret key to the DxE region via a hand-off block (HOB), wherein the HOB comprises a format readable by the DxE region;
store the random number shared secret key in a system management random access memory (SMRAM);
transmit the random number shared secret key to an embedded controller of the BIOS;
hash the updated program of instructions using the random number shared secret key;
securely transfer the updated program of instructions from the DxE region to a private SPI chip, wherein the private SPI chip is controlled by the embedded controller; and
present an update progress message to a display screen, using a video option read-only memory (ROM), while securely transferring the updated program of instructions from the DxE region of the shared SPI chip to the private SPI chip, regardless whether the video option ROM is trusted.

8. The non-transitory machine-readable storage medium of claim 7, wherein the instructions upon execution cause the electronic device to:
verify authentication of the hashed updated program of instructions at the private SPI chip using the random number shared secret key;
reset the shared SPI chip when the authentication of the hashed updated program of instructions is verified;
remove the first chipset lock from the first PEI region of the shared SPI chip; and
transfer the updated program of instructions to the first PEI region of the shared SPI chip.

9. The non-transitory machine-readable storage medium of claim 7, wherein the instructions upon execution cause the electronic device to instruct the BIOS to remove the random number shared secret key from the DxE region by a secure zero memory operation.

10. The non-transitory machine-readable storage medium of claim 7, wherein the instructions upon execution cause the electronic device to reboot the shared SPI chip upon the BIOS securely transferring the updated program of instructions from the DxE region to the private SPI chip.

11. The non-transitory machine-readable storage medium of claim 10, wherein the instructions upon execution cause the electronic device to securely remove the random number shared secret key from the DxE region following the reboot.

12. The non-transitory machine-readable storage medium of claim 11, wherein the instructions upon execution cause the electronic device to instruct the BIOS to retain the random number shared secret key in the DxE region while transmission of the updated program of instructions from the DxE region to the private SPI chip is in progress.

13. A system comprising:
a shared serial peripheral interface (SPI) chip of a basic input/output system (BIOS) of a computer, comprising:
a first region configured to store a first copy of pre-extensible firmware interface (PEI) program of instructions;
a second region configured to store a second copy of PEI program of instructions; and
a third region configured to:
store a driver execution environment (DXE) program of instructions; and
display a progress of an update of the first PEI program of instructions, using a video option read-only memory (ROM) and the DXE program of instructions;
wherein the shared SPI chip is configured to apply a first chipset lock to the first region, and apply a system management memory mode lock to the second and third regions, and
wherein the BIOS is set to:
update the second copy of the PEI program of instructions;
execute the updated second copy of the PEI program of instructions;
apply a second chipset lock to the second region of the shared SPI chip;
generate a random number shared secret key;
transmit the random number shared secret key to the third region of the shared SPI chip; and
store the random number shared secret key in a system management random access memory.

14. The system of claim 13, comprising:
an embedded controller of the BIOS; and
a private SPI chip electronically coupled to the embedded controller;
wherein the BIOS is set to:
transmit the random number shared secret key to the private SPI chip; and
seal a trusted application program interface on the embedded controller to secure the random number shared secret key.

15. The system of claim 14, wherein the BIOS is set to:
securely transfer the updated second copy of the PEI program of instructions from the second region to the private SPI chip;
hash the updated second copy of the PEI program of instructions using the random number shared secret key before transferring to the private SPI; and
display the update progress, using the video option ROM, while securely transferring the updated second copy of the PEI program of instructions.

16. The system of claim 15, wherein the embedded controller is set to:
verify authentication of the hashed updated second copy of the PEI program of instructions using the random number shared secret key from the private SPI chip; and
reset the shared SPI chip when the authentication of the hashed updated second copy of the PEI program of instructions is verified.

17. The system of claim 16, wherein the embedded controller is set to:
remove the first chipset lock from the first region of the shared SPI chip; and
transfer the updated second copy of the PEI program of instructions to the first region of the shared SPI chip.

18. The system of claim 16, wherein a hashed version of the second copy of the PEI program of instructions is divided into multiple blocks of data and is sent to the private SPI chip of the embedded controller one block at a time.

19. The system of claim 18, wherein the embedded controller is set to verify an authentication of each individual block.

20. The system of claim 18, wherein individual blocks are rearranged in succession to reconstruct a transmitted hashed version of the second copy of the PEI program of instructions, and wherein the embedded controller is to verify an authentication of received data after the data is reconstructed.

* * * * *